United States Patent Office 3,376,201
Patented Apr. 2, 1968

3,376,201
CLADDED CERAMIC NUCLEAR REACTOR FUEL ELEMENT HAVING AXIAL VOID
Alastair S. Bain, Deep River, Ontario, Canada, assignor to Atomic Energy of Canada Limited, Ottawa, Ontario, Canada, a corporation of Canada
Filed Apr. 25, 1966, Ser. No. 545,012
4 Claims. (Cl. 176—67)

ABSTRACT OF THE DISCLOSURE

A nuclear reactor fuel element has a sheathing member of such thickness that it would be collapsible under the expected coolant pressures in a nuclear reactor if not forced against the surface of the fuel elements. The nuclear fuel is in the form of uranium dioxide pellets having an axial void. The fuel element is designed to be operated at a temperature so that the central portion of the fuel is in a plastic condition and swells into the axial void which is approximately 4% by volume and only sufficiently large to accommodate this expansion.

This invention relates to a nuclear reactor fuel element and, in particular, to a fuel element capable of operation at high power levels with the minimum of distortion.

The design of a fuel element for use in nuclear reactors requires the resolution of many conflicting factors. The fuel is normally contained in a protective sheath to give it structural rigidity and to prevent fission products from reaching the cooling system. The protective sheath will, undesirably, absorb neutrons and must be made as thin as possible consistent with the aim of preventing distortion of the fuel element. Such distortion may adversely affect heat transfer to the cooling system and also lead to contamination by rupture of the sheath. If the nuclear fuel is operated at low power ratings and hence low temperatures it will be less likely to distort the protective sheath. This, however, is abviously uneconomical.

It is an object of this invention to provide a novel fuel element for a nuclear reactor capable of operation at high power levels substantially without distortion.

It is a more specific object of this invention to provide a novel fuel element for a nuclear reactor having uranium dioxide as the fuel and capable of operation at high power levels substantially without distortion.

It has been found that a suitable fuel element for operation at high powers in nuclear reactors can be formed by using a collapsible sheath. By "collapsible sheath" is meant a sheath having such a thickness that it would collapse under coolant pressure if not filled with nuclear fuel. It has been found that, by providing an axial void of specified volume in the nuclear fuel filling the sheath, the fuel element may be operated at high power ratings substantially without distortion. Accordingly, the nuclear reactor fuel element of this invention comprises a collapsible sheath surrounding the nuclear fuel in compressed preferably, pellet form. The nuclear fuel is formed to have an axial void of volume approximately 4% of the volume of the fuel.

Figure 1:
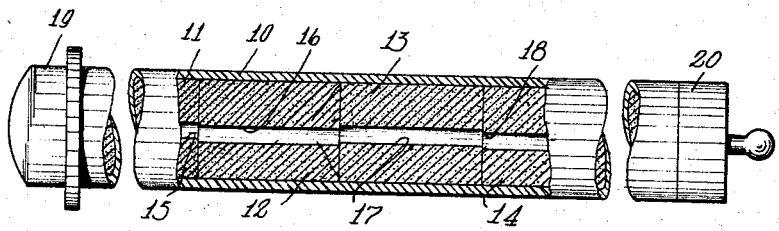
Figure 2:
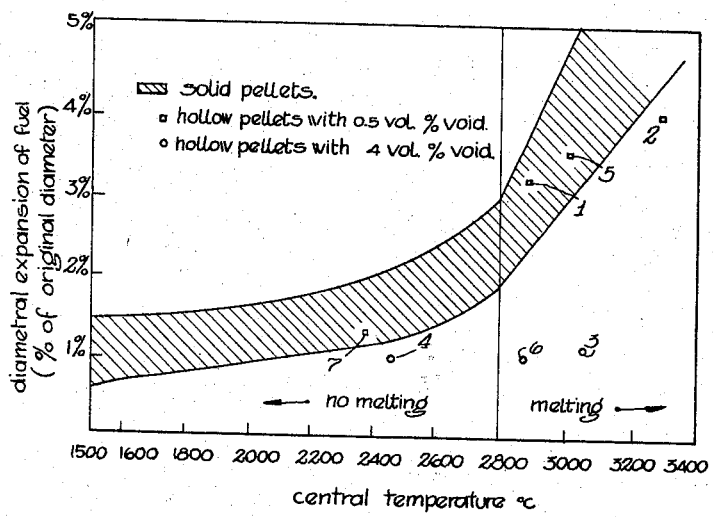

Other features and objects of this invention will become apparent from the following description of a preferred embodiment of this invention taken in conjunction with the accompanying drawings, in which:

FIGURE 1 is a fragmentary view, in partial cross-section, of a fuel element according to this invention, and FIGURE 2 is a graphical representation of the diametral expansion of fuel elements including fuel elements constructed in accordance with this invention.

Referring now to FIGURE 1 there is shown a fragmentary view of a fuel element of this invention. A collapsible sheath 10, surrounds pellets of compressed nuclear fuel 11, 12, 13 and 14. Axial voids 15, 16, 17 and 18 are formed in fuel pellets 11, 12, 13 and 14 respectively.

The fuel element shown in FIGURE 1 is intended for use at power ratings at which the nuclear fuel becomes appreciably plastic but not melted. It is not desirable that the nuclear fuel be permitted to melt since the relatively large volume change accompanying the change of state may itself cause distortion.

The fuel element of this invention is not restricted to use with particular nuclear fuel but may be used with any nuclear fuel which is appreciably plastic at the operating temperature so that any expansion, whether of a straightforward thermal nature or due to fission products, may be taken up by deformation into the central void. In particular uranium dioxide has been found to be a suitable fuel and at a temperature of 2550° C. is sufficiently plastic to deform into a central void when encased in a collapsible sheath exerting 750 p.s.i. pressure due to tension in addition to 1400 p.s.i. pressure from the coolant flow.

For ease of assembly the nuclear fuel may be fabricated in pellet form, as shown in FIGURE 1, to be slipped into the sheath during assembly. That is, the fuel to sheath gap is not zero. As has been shown in FIGURE 1, the axial voids of adjacent pellets need not be accurately aligned. The void size depends on the thermal expansion and plasticity of the fuel at the operating temperature. For $UO_2$ fuel, in the form of sintered pellets having 96% of theoretical density, diameter 0.75 in., operating at a central temperature of 2700° C. and a peripheral temperature of 550° C. the required void volume, expressed as a percentage of pellet volume, is 4%.

The thickness of the sheath 10 is dependent on the operating pressures and temperatures and is chosen to be as small as possible to give minimum neutron absorption. Stainless steel or zirconium alloys such as zircaloy-2 are suitable materials for the collapsible sheath. A typical sheath thickness when using zircaloy-2 is in the region of 0.6 mm.

It will be clear to those skilled in the art that the fuel elements of this invention may be fabricated by several methods. For example, they may be formed by rotary swaging with a removable central mandrel. Alternatively, sintered pellets with an axial hole may be placed in preformed sheathing. Since it is not necessary that the axial holes be aligned from pellet to pellet, the holes may be formed in the pellets prior to sintering or drilled in the pellets after sintering. The pellets are then slipped into the fuel element sheathing and end fittings 19 and 20 welded into place.

The following example is illustrative of the utility of the fuel element of this invention.

Example

Seven fuel elements, consisting of collapsible zircaloy-2-sheathing containing hollow $UO_2$ pellets, were prepared having the dimensions given in Table 2. It will be noted that all elements had a small diametral clearance from the fuel sheathing, fuel elements 1, 2, 5 and 7 had 0.5% axial voids and fuel elements 3, 4 and 6 had 4% axial voids.

The fuel elements were irradiated in a nuclear reactor, pressurized water, testing loop for a period of several days. The water coolant was circulated at a temperature of 260° C. and a pressure of 100 kg./cm.² This pressure would have collapsed the zircaloy-2 sheathing if the nuclear fuel had not been present. The distribution of the neutron flux was such that the fuel elements operated at varying heat ratings. The power output of each fuel element was calculated from data supplied by cobalt monitors and calorimetric measurements on the coolant. These calculated power outputs for each of the fuel elements are shown in Table 1.

TABLE 1

| Element | Average Output (kw.) | Linear Output (w./cm.) | Peak Output (kw.) | Peak Linear Output (w./cm.) |
|---|---|---|---|---|
| 1 | 15.5 | 1,020 | 16.5 | 1,085 |
| 2 | 18.9 | 1,245 | 20.1 | 1,325 |
| 3 | 17.2 | 1,140 | 18.3 | 1,210 |
| 4 | 13.1 | 860 | 13.9 | 915 |
| 5 | 17.2 | 1,130 | 18.0 | 1,180 |
| 6 | 15.5 | 1,020 | 16.2 | 1,065 |
| 7 | 12.3 | 810 | 12.9 | 845 |

TABLE 2

| Element | Zircaloy-2 Sheath | | | Fuel-Sheath Diametral Clearance (mm.) | Length Overall (mm.) | Axial Hole | |
|---|---|---|---|---|---|---|---|
| | Outer Dia. (mm.) | Inner Dia. (mm.) | Wall Thickness (mm.) | | | Dia. (mm.) | Vol. Percent of pellet |
| 1 | 20.29-20.32 | 19.03 | 0.63 | 0.09/0.11 | 179.81 | 1.25 | 0.5 |
| 2 | 20.28-20.32 | 19.03 | 0.63 | 0.09/0.11 | 179.77 | 1.25 | 0.5 |
| 3 | 20.23-20.32 | 19.03 | 0.63 | 0.08/0.11 | 179.79 | 3.68 | 4 |
| 4 | 20.28-20.32 | 19.03 | 0.63 | 0.08/0.11 | 179.79 | 3.68 | 4 |
| 5 | 20.29-20.32 | 19.03 | 0.63 | 0.09/0.11 | 180.00 | 1.25 | 0.5 |
| 6 | 20.27-20.34 | 19.03 | 0.63 | 0.08/0.11 | 175.98 | 3.68 | 4 |
| 7 | 20.29-20.32 | 19.03 | 0.63 | 0.09/0.11 | 179.78 | 1.25 | 0.5 |

The fuel elements were removed from the testing loop and their dimensions measured and the dimensional change of the nuclear fuel pellets calculated. The central temperature of the $UO_2$ fuel in the fuel elements was calculated from the average and maximum power outputs of each element using the relationship tabulated in Journal of Nuclear Materials 7, No. 3, pp. 225–262, December 1962. FIGURE 2 shows the diametral expansion of each fuel element plotted against the central temperature of the uranium oxide pellets. The hatched area shows previously obtained results for uranium oxide pellets not having an axial void.

The measurements of diametral expansion shown in FIGURE 2 indicate that fuel pellets having a 0.5% axial void, that is elements 1, 2, 5 and 7, perform in a substantially identical fashion to solid elements. The fuel pellets having a 4% axial void have very much less diametral expansion then the other fuel pellets. The initial 1% of diametral expansion of the fuel takes up the original clearance from the sheath plus the elastic and thermal expansion of the sheath. Subsequent expansion places increasing strain on the sheath.

The fuel elements were cut with tubing cutters and the fractured surface of the $UO_2$ examined. It was determined that in the highly rated elements the axial voids had been closed during irradiation and that the melting point of $UO_2$ had been exceeded in these elements. The 10% increase in volume exhibited by $UO_2$ is believed to account for the relatively large expansion of elements 1, 2 and 5.

It was found that element 3 displayed sufficient ovality possibility to interfere with efficient coolant circulation in a nuclear reactor. It is pressumed that this ovality was caused by the coolant pressure acting on the fuel pellet which had a substantial portion in a molten condition. It is, therefore, desirable that the fuel elements of this invention be operated at power ratings such that the central core of the nuclear fuel is in a plastic deformable condition but is not melted.

Thus there has been disclosed a novel fuel element for a nuclear reactor using collapsible sheathing and capable of operation at high power levels without distortion. It will be clear to those skilled in the art that various modifications can be made to the particular embodiment which has been described without departing from the teachings of this invention. For example, it is not necessary that the central void be of circular cross section nor that the void extend through each pellet. The invention is not limited to the sheathing and nuclear fuel materials disclosed but extends to their obvious equivalents. Such other nuclear fuel materials include $ThO_2$, mixed oxides of $ThO_2$ and $UO_2$, $PuO_2$, mixed oxides of $UO_2$ and $PuO_2$, mixed oxides of $PuO_2$ and $ThO_2$, UC and $UO_2$-metal cermets.

I claim:

1. A nuclear reactor fuel element for use in pressurized coolant comprising,
   a tubular sheath collapsible under high pressure coolant flow exerting pressures of the order of 100 kg./cm.$^2$. defining an enclosed space, and
   ceramic nuclear fuel enclosed in said sheath having an outer surface substantially conforming to the inner surface of said sheath,
   said nuclear fuel defining a centrally located void, the volume of said void being up to the order of 4% and only substantially sufficient to accommodate the resulting inwardly directed expansion of said nuclear fuel when in a plastic condition and under the constraint of said sheath.

2. A fuel element as defined in claim 1 wherein said nuclear fuel consists of a plurality of tubular pellets having an axial void coaxial with said tubular sheath.

3. A fuel elements as defined in claim 2 wherein said tubular pellets are sintered uranium dioxide.

4. A fuel elements as defined in claim 1 wherein said sheath is formed from zirconium alloy of thickness approximately 0.6 mm.

References Cited

UNITED STATES PATENTS

| 3,009,869 | 11/1961 | Bassett | 176—72 X |
| 3,043,761 | 7/1962 | Reynolds | 176—67 |
| 3,085,954 | 4/1963 | Stohr et al. | 176—73 |
| 3,184,392 | 5/1965 | Blake | 176—73 X |
| 3,215,607 | 11/1965 | Lackey | 176—73 X |
| 3,274,069 | 9/1966 | Alfille | 176—72 |

FOREIGN PATENTS

| 800,397 | 8/1958 | Great Britain. |
| 612,936 | 11/1960 | Italy. |

L. DEWAYNE RUTLEDGE, *Primary Examiner.*

CARL D. QUARFORTH, *Examiner*

M. J. SCOLNICK, *Assistant Examiner.*